US007228285B2

(12) United States Patent
Hull et al.

(10) Patent No.: US 7,228,285 B2
(45) Date of Patent: Jun. 5, 2007

(54) AUTOMATED METHOD AND SYSTEM FOR AUTOMATED TRACKING, CHARGING AND ANALYSIS OF MULTIPLE SPONSOR DISCOUNT COUPONS

(75) Inventors: Nicky Hull, Headington (GB); Dak Liyanearachchi, Northants (GB)

(73) Assignee: Catalina Marketing Corporation, St. Petersburg, FL (US)

( * ) Notice: Subject to any disclaimer, the term of this patent is extended or adjusted under 35 U.S.C. 154(b) by 733 days.

(21) Appl. No.: 09/452,678

(22) Filed: Dec. 1, 1999

(65) Prior Publication Data

US 2001/0042008 A1  Nov. 15, 2001

(51) Int. Cl.
*G06F 17/60* (2006.01)
(52) U.S. Cl. ...................................................... 705/14
(58) Field of Classification Search .................. 705/10, 705/14, 18; 715/14
See application file for complete search history.

(56) References Cited

U.S. PATENT DOCUMENTS

| 4,554,446 A | 11/1985 | Murphy et al. ............. 235/487 |
| 4,723,212 A | 2/1988 | Mindrum et al. ............. 705/14 |
| 4,910,672 A * | 3/1990 | Off et al. ...................... 705/14 |
| 5,056,019 A * | 10/1991 | Schultz et al. ................ 705/14 |
| 5,173,851 A | 12/1992 | Off et al. ...................... 705/14 |
| 5,201,010 A | 4/1993 | Deaton et al. ............... 382/139 |
| 5,237,620 A | 8/1993 | Deaton et al. ................ 705/14 |
| 5,305,196 A | 4/1994 | Deaton et al. ................ 705/10 |
| 5,327,508 A | 7/1994 | Deaton et al. ............... 382/100 |
| 5,388,165 A | 2/1995 | Deaton et al. ............... 382/139 |
| 5,430,644 A | 7/1995 | Deaton et al. ................ 705/14 |
| 5,448,471 A | 9/1995 | Deaton et al. ................ 705/14 |
| 5,481,094 A | 1/1996 | Suda ............................ 705/14 |
| 5,592,560 A | 1/1997 | Deaton et al. ............... 382/100 |
| 5,612,868 A | 3/1997 | Off et al. ...................... 705/14 |
| 5,621,812 A | 4/1997 | Deaton et al. ............... 382/100 |
| 5,638,457 A | 6/1997 | Deaton et al. ............... 382/100 |
| 5,642,485 A | 6/1997 | Deaton et al. ................ 705/14 |
| 5,644,723 A | 7/1997 | Deaton et al. ................ 705/14 |
| 5,649,114 A | 7/1997 | Deaton et al. ................ 705/14 |
| 5,659,469 A | 8/1997 | Deaton et al. ................ 705/14 |
| 5,675,662 A | 10/1997 | Deaton et al. ............... 382/137 |
| 5,687,322 A | 11/1997 | Deaton et al. ................ 705/14 |

(Continued)

FOREIGN PATENT DOCUMENTS

EP        000511463 A2 *  4/1992

OTHER PUBLICATIONS

"King Coupon", BrandMarketing Supplement to Supermarket News, v. IV, n. 8, p. 10+, Aug. 1997.*

(Continued)

*Primary Examiner*—Donald L. Champagne
(74) *Attorney, Agent, or Firm*—Neifeld IP Law, PC

(57) ABSTRACT

A method and system to manage the operation of multiple item promotions which provide a benefit to a customer who purchases a specified combination of items. The present invention monitors purchases in conjunction with Point Of Sale (POS) processing in a retail store and determines when purchase combination promotions are satisfied by a customer's purchase selections. The present invention stores a description of the items purchased in conjunction with the promotion, stores the cost of the promotion to be charged to each sponsor for each benefit or discount provided, and tracks future redemption of coupons or paperless equivalents that were issued in conjunction with a purchase combination promotion.

52 Claims, 3 Drawing Sheets

U.S. PATENT DOCUMENTS

| | | |
|---|---|---|
| 5,832,457 A | 11/1998 | O'Brien et al. ............... 705/14 |
| 5,864,822 A * | 1/1999 | Baker, III .................... 705/14 |
| 5,926,795 A | 7/1999 | Williams ..................... 705/14 |
| 6,332,128 B1 | 12/2001 | Nicholson .................... 705/14 |
| 2002/0019885 A1* | 2/2002 | Sleeper ....................... 709/318 |

OTHER PUBLICATIONS

Investor relations portion of the Catalina Marketing website, accessed on Nov. 9, 2004 at http://www.catmktg.com/about_us/investor_relations/, 3 pp.*

* cited by examiner

| Promo ID | Coupon # | Cust. ID | Total Value | Exp. Date | Items Purch. | Promo Cost |
|---|---|---|---|---|---|---|
| X | 4333 | 8734 | $0.70 | 3/3/1999 | Item X | $0.25 |
|   |   |   |   |   | Item Y | $0.25 |
|   |   |   |   |   | Item Z | $0.25 |
| Y | 4334 |   | $0.90 | 3/1/1999 | Item A | $0.75 |
|   |   |   |   |   | Item B | $0.25 |
| X | 4335 | 6533 | $0.70 | 3/5/1999 | Item W | $0.25 |
|   |   |   |   |   | Item Y | $0.25 |
|   |   |   |   |   | Item Z | $0.25 |

FIG. 5

| Promo ID | Total Value | Cust. ID | Items Purch. | Promo Cost |
|---|---|---|---|---|
| X | $0.70 | 1323 | Item X | $0.25 |
|   |   |   | Item Y | $0.25 |
|   |   |   | Item Z | $0.25 |
| K | $0.45 |   | Item F | $0.35 |
|   |   |   | Item G | $0.15 |
| X | $0.70 | 6533 | Item W | $0.25 |
|   |   |   | Item Y | $0.25 |
|   |   |   | Item Z | $0.25 |

FIG. 6

AUTOMATED METHOD AND SYSTEM FOR AUTOMATED TRACKING, CHARGING AND ANALYSIS OF MULTIPLE SPONSOR DISCOUNT COUPONS

BACKGROUND OF THE INVENTION

1. Field of the Invention

The present invention is related to the automated processing of retail sales promotional discounts and, in particular, to the automated tracking, charging and analysis of retail sales promotions offered by a plurality of sponsors.

2. Discussion of the Background

Discount coupons have been a successful marketing promotion technique to improve the sale of items. The majority of coupons given to consumers today give a discount to customers who purchase a specified single item. The redemption procedure at the point of sale for such coupons is relatively straightforward because the retailer has to only identify if that one item has been purchased prior to giving the customer the specified discount. The processing of these coupons by the retailer and sponsor of the promotion, who is usually the manufacturer of the item, is also fairly straightforward since the retailer is only required to return the coupon to the sponsor or the sponsor's agent to receive the cost of the discount that the retailer provided to the customer.

Retail sales promotions are also offered which provide a discount if a customer purchases a specified combination of items. These multiple item promotions give the customer a choice of items which he or she may purchase and receive a benefit. Providing multiple item promotions involving items promoted by different entities has been limited by the mechanism followed by retailers to redeem coupons at the point of sale. Retailer procedures for redeeming coupons are focused upon promotions which only require the purchase of a single item and therefore only one sponsor of the promotion may be charged for the discount provided to the customer. Coupons or other promotions which require a customer to purchase several items from several manufactures or sponsors have not been practical because apportionment of the costs cannot effectively be made given the procedures currently used by retailers to redeem coupons. The cost of existing multiple item promotions are generally divided equally among all of the sponsors participating in the promotion without regard to the number of items sold by each sponsor as a result of the promotion.

SUMMARY OF THE INVENTION

It is a object of the present invention to improve the flexibility and practicality of offering promotions.

It is a further object of the present invention to provide an improved technique to monitor multiple item promotions.

It is another object of the present invention to improve collection of information concerning customer preferences.

It is yet another object of this invention to allow more accurate apportionment of each sponsor's cost of a multiple sponsor marketing promotion.

The present invention achieves these objectives by providing a method and system for automatically determining whether purchase selections made by a customer satisfy the conditions associated with any multiple item promotions available to that customer, providing a benefit associated with multiple item promotions satisfied by that customer's purchases and automatically debiting the sponsors of that promotion for the cost of the benefit provided to the customer. The present invention also automatically determines if a customer purchases items which qualify the customer to receive a single token or coupon that contains an accumulation of discounts corresponding to multiple items the customer has purchased, stores a description of the purchased items corresponding to the discounts on the single token or coupon, tracks the redemption of that single token or coupon and automatically debits the sponsors of the items which were purchased that triggered the generation of that coupon for the cost of the discount provided to the customer. The present invention further stores information regarding the benefits provided under the multiple item promotions to support gathering marketing statistics to support analysis of the effectiveness of the promotions. The present invention may further store data in association with a customer's identification to analyze that customer's acceptance of multiple item promotions and the actual combination purchase selections made by that customer.

BRIEF DESCRIPTION OF THE DRAWINGS

FIG. 5 illustrates the contents of a future discount database used by the present invention.

FIG. 6 illustrates the contents of a redemption database used by the present invention.

DESCRIPTION OF THE PREFERRED EMBODIMENTS

The present invention addresses more thorough processing and more accurate and complete accounting of costs and redemption statistics associated with multiple item promotions. Multiple item promotions used by the present invention include two types of promotions, accumulated discount promotions and purchase combination promotions. These promotions provide incentives, such as discounts, to customers to entice them to purchase multiple items. A complete understanding of the features and benefits of the present invention is facilitated by first describing these promotions.

One type of multiple item promotion processed by the present invention is referred to herein as an "accumulated discount promotion." An accumulated discount promotion gives a customer who has purchased at a specified retailer a coupon for a future discount on any purchase made from the same retailer. An accumulated discount promotion is a promotion which gives a customer a future discount in response to the customer's purchase of multiple qualifying items. An accumulated discount promotion determines if the set of items purchased by the customer contains multiple items which each qualify for a future discount. The checkout system will then generate a single token which contains the accumulation of each of the multiple future discounts corresponding to all of the qualifying items purchased.

Figure 4:
FIG. 4 illustrates a printed accumulated discount coupon generated by the present invention.

An accumulated discount coupon, which is illustrated in FIG. 4, obviates the need to print a plurality of coupons, where each coupon would correspond to an individual qualifying item, when customers purchase multiple items. The items which triggered the discount, and the discount amount, is itemized on the coupon illustrated in FIG. 4, and the total discount is also printed. Offering a future discount, as opposed to providing a discount on the purchase of the qualifying item itself, has the advantage of requiring the customer to return to the retailer and make a subsequent purchase. The accumulated discount coupon has the further advantage of being a single coupon with a higher value that the customer is more likely to retain and bring back to the retailer to redeem. The present invention addresses automated tracking of the multiple items (and their associated sponsors) that were sold which triggered the accumulated discount.

Another type of multiple item promotion processed by the present invention is a "purchase combination promotion." A purchase combination promotion is a promotion which will give a customer a discount or other benefit if the customer purchases a predetermined combination of items. A customer may be made aware of a purchase combination promotion by in store advertising, or coupons indicating the combination purchase requirement for that promotion. The predetermined combination of items is defined by a combination purchase requirement which may specify a definite combination of items that must be purchased, or the combination purchase requirement may specify that the customer is required to purchase a described subset of an enumerated list of items. Satisfaction of the combination purchase requirement is a precondition to receiving a purchase combination discount or other benefit. An example of a combination purchase requirement may state "buy any 2 of items A, B and C and receive a one dollar discount." In this example, the benefit associated with the purchase combination promotion (a one dollar discount) is provided to the customer if the customer's purchases any two of the three specified items: A, B or C.

A purchase combination promotion's benefit may be a coupon providing a discount to be applied during the customer's subsequent shopping visit. This type of coupon has the same advantage to the retailer as the accumulated discount coupon in that the customer must make a subsequent shopping visit to receive the benefit.

A display of a combination purchase requirement of a purchase combination promotion may also be of the form "Purchase A and B, and receive C free!" This promotion requires the customer to purchase A and B, and the retailer will then give the customer one of item C at no charge in order to provide the benefit associated with the promotion.

Multiple item promotions are characterized by giving the customer a benefit in response to the customer's purchase of a combination of several items. The sponsor may be the manufacturer of the item, a marketer of the item or a promoter that is using the discount of the item as part of a promotion. Each item in the combination of the several items may be manufactured, marketed or promoted by different entities. If various items of the combination are sponsored by different sponsors, the present invention apportions the cost of the benefits given in association with the promotion among the several sponsors. For each benefit delivered in association with a promotion, the present invention records the items purchased which triggered the delivery of the benefit to the customer and apportions the cost of the delivered benefit among the sponsors of those items according to actual sales. This allows the cost of the benefit to be paid by the sponsors of items actually purchased by the customer.

Promotions may require a customer to purchase several items that are produced by the same manufacturer or sponsored by the same sponsor. It may still be desirable in this type of promotion to determine each of the items sold that resulted in the delivery of a benefit associated with a multiple item promotion. This is because it may be desirable to accurately track the promotional costs of each item or brand and the increased sales of each item or brand that are attributable to the promotion.

Current retail systems do not track the items which are purchased by customers in conjunction with multiple item promotions or accumulate statistics of these item sales. This failure to associate multiple item promotion benefits which are delivered to customers with the purchased items that triggered the benefit prevents the accurate apportionment of the cost of the promotion to the sponsors who actually sell items as a result of the promotion. If the benefit provided by the multiple item promotion is a coupon, charging each sponsor when the coupon is issued, as opposed to when the coupon is redeemed, is also not an accurate billing technique. This is because the coupon may not be redeemed and the total coupon cost will not actually be incurred by the retailer, i.e. no discount will be given to the customer if the coupon is not redeemed.

Multiple item promotions may be offered to customers in a variety of ways that affect the scope of customers that receive the promotional offer. A multiple item promotion may be made available to all customers of a particular retailer without the need to present personal identification or a certificate indicating the promotion. A multiple item promotion may also be made available to individual customers who identify themselves to the retailer through a prescribed method or who present a certificate, such as a printed coupon, when they purchase the specified items of a qualifying purchase, in order to receive the benefit of the promotion. A retailer may offer multiple item promotions to members of the retailer's frequent shopper club (which retailers in the United Kingdom refer to as a "loyalty scheme"), and these members are then required to present their frequent shopper's club membership identification to have the promotion made available to them. A retailer may offer multiple item promotions to individuals with certain demographic characteristics, such as geographic residence location. A retailer could offer residents of a certain geographic area a multiple item promotion and base the customer's identification upon the customer's telephone number or address, which the retailer will determine for each residence in the desired geographic area, and which the customer provides during a purchase transaction. Retailers may also offer multiple item promotions to users of selected internet web sites or other internet facilities. The retailer could provide users of selected internet facilities, such as web sites, a code number to identify himself or herself and take advantage of the offer. A code number provided through an internet facility may be given to the user by a downloaded document that the user prints and that contains the number, optionally encoded into a printed bar code that may be read by the retailer's checkout system.

Figure 3:
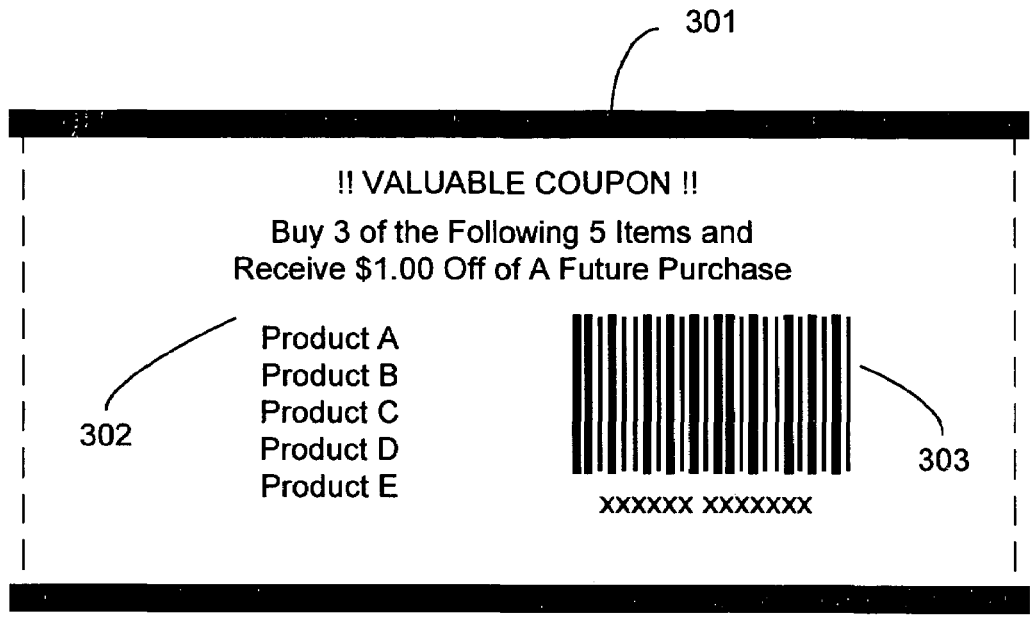
FIG. 3 illustrates a coupon offering a purchase combination promotion which is accepted by the present invention.

An example of a purchase combination promotion made through a printed coupon is illustrated in FIG. 3. FIG. 3 illustrates a printed coupon 301 specifying a purchase combination promotion which allows the presenter of the coupon to receive a discount if qualifying purchases, i.e. purchases satisfying the purchase requirement of the promotion, are contained in the total set of purchase selections presented by the customer for purchase at checkout. The coupon 301 contains a specification of purchase requirements 302 that must be made in order to receive the benefit further specified on the coupon. The example combination purchase requirement 302 illustrated on that particular coupon 301 defines the subset that the customer must purchase to be any three of the five items listed (items A, B, C, D, and E) in order or combination to receive the one dollar discount.

The coupon 301 further has a printed bar code 303 which contains an encoded coupon number that identifies the purchase combination promotion printed on the coupon. Printing an encoded identification of the promotion allows automated retrieval of the multiple sponsor purchase requirements associated with that coupon when that coupon is presented.

The printed coupon 301 may be either pre-printed and distributed to potential customers or the printed coupon 301 may be prepared individually for a customer and directed to the customer's demonstrated purchasing habits. Distribution of pre-printed coupons may include mailings, publication in periodicals or distribution within the retailer facility. Individually prepared coupons may be printed at the checkout location in response to a customer purchase or printed and communicated to the customer through mail, e-mail or hand delivery.

Figure 1:
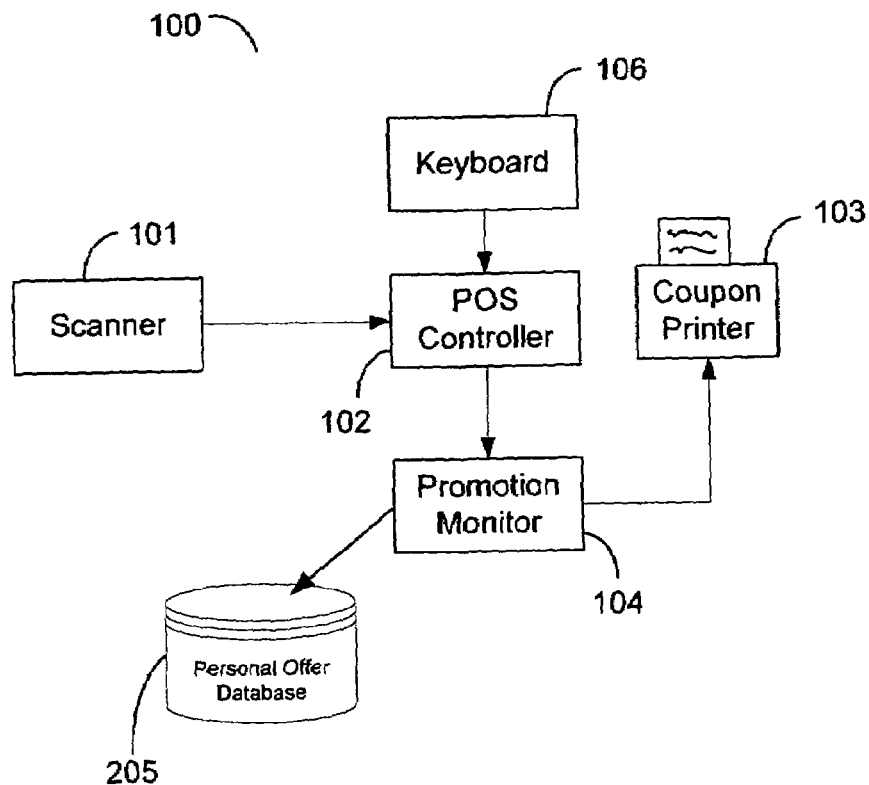
FIG. 1 illustrates a general schematic diagram of a Point of Sale (POS) system implementing the present invention.

FIG. 1 illustrates a generalized block diagram of a retail checkout Point of Sale (POS) system implementing an embodiment of the present invention. The system illustrated in FIG. 1 shows a Point Of Sale (POS) system 100 comprising components used in conventional POS systems that determine the items a customer is purchasing and determine the total cost of the purchase. Determining the items the customer is purchasing comprises first generating a machine readable list of purchase selections made by a customer. The generation of this machine readable list uses scanner 101 to optically read printed bar code data affixed or attached to each item that the customer is purchasing and which identifies the item. The operator of the POS system passes the printed bar code identifying each item across the scanner 101 and the scanner will generate a machine readable code corresponding to the item and communicate that code to the POS controller 102. The POS controller 102 will accumulate the codes generated by the scanner 101 and create an electronically readable list of purchase selections made by that customer.

Some embodiments of the illustrated system may include the capability to have the POS system identify the customer making the purchase. Methods used by a POS system to identify a customer include scanning an identification card, such as a frequent shopper's club card, that is encoded with a printed bar code identifying the customer. Alternative identification techniques include a frequent shopper's club card with a magnetic stripe identifying the customer or determining a checking account used by the customer. The POS controller 102 in these embodiments will determine the customer's identification through the device used by that embodiment. Existing POS systems use customer identification to track purchase selections and for other purposes known to practitioners in the relevant arts.

Personally offering the customer a purchase combination promotion and requiring the customer to present identification when he or she makes the specified purchase may be used as an alternative to requiring the customer to present a coupon identifying a purchase combination promotion. The POS system 100 illustrated in FIG. 1 stores, in association with an identification of each customer, promotion offers made to each individual customers in the personal offer database 205. The customer is identified during the checkout process through the methods described in this description and the offers associated with his or her identification are retrieved. Notification of offers made to individual customers may be given to each customer through mailings to the customer's home, through electronic communications including e-mail, or through a notice given during a purchase transaction wherein the customer purchases a specified item which triggers the offering of a purchase combination promotion to the customer at the point of sale. The customer receiving an offer which only requires the customer to identify himself or herself may still receive a printed notice of the promotion, but this printed notice is not used by the retailer to redeem the offer and the customer does not present it during the subsequent purchase to redeem the offer.

A further advantage of having the customer provide personal identification in association a purchase combination promotion is that the purchasing pattern, and in particular a pattern of purchase combination promotion redemption, may be observed for each customer over many shopping visits. The identity of the customer may be stored with data defining the items selected for purchase in association with a purchase combination promotion or the customer's identification may be stored in association with all of the items selected for purchase by that customer. This accumulated purchase history data may be used to direct further purchase combination promotions to the customer. The determination and analysis of such purchase and promotion redemption pattern data allows more effective targeting of promotions to individual customers as well as better evaluation of the promotion's effectiveness in general. A method and apparatus to provide purchasing incentives based upon a customer's purchase history is disclosed in U.S. Pat. No. 5,832,457. U.S. Pat. No. 5,832,457 and all references therein are herein incorporated by reference.

A sales transaction allows the retailer to notify the customer of promotional offers which are available to that customer either as a result of qualifying purchases or in general. One technique to notify customers of promotional offers made to them is giving the customer coupons, which the customer must retain and later present, representing the offer during the checkout process. An example of such a coupon, which offers a purchase combination promotion, is shown in FIG. 3 and includes a bar code 303 which uniquely identifies the promotion and supports the retrieval of the definition of the promotion. An alternative to giving the customer a coupon is storing a definition of the promotional offer in association with the customer's personal identification and allowing the customer to present personal identification allowing the retail system to retrieve promotional offers made to that customer. The preferred embodiment of the present invention stores promotional offers made to customers in the personal offer database 205. Promotional offers made to a customer who identifies himself or herself at the time of purchase are recalled from the personal offer database 205 as part of the checkout process.

The architecture of the embodiment shown in FIG. 1 is for an entire POS system designed to implement the present invention. Alternative embodiments of the present invention may be designed to augment existing Point of Sale systems currently installed in stores. These alternative embodiments will have architectures based upon the teaching of this specification, but their architecture will be adapted to properly interact with the existing equipment. The adaptation of embodiments of the present invention to accommodate existing POS systems is obvious to practitioners in the relevant arts in light of the teachings of this specification.

Figure 2:
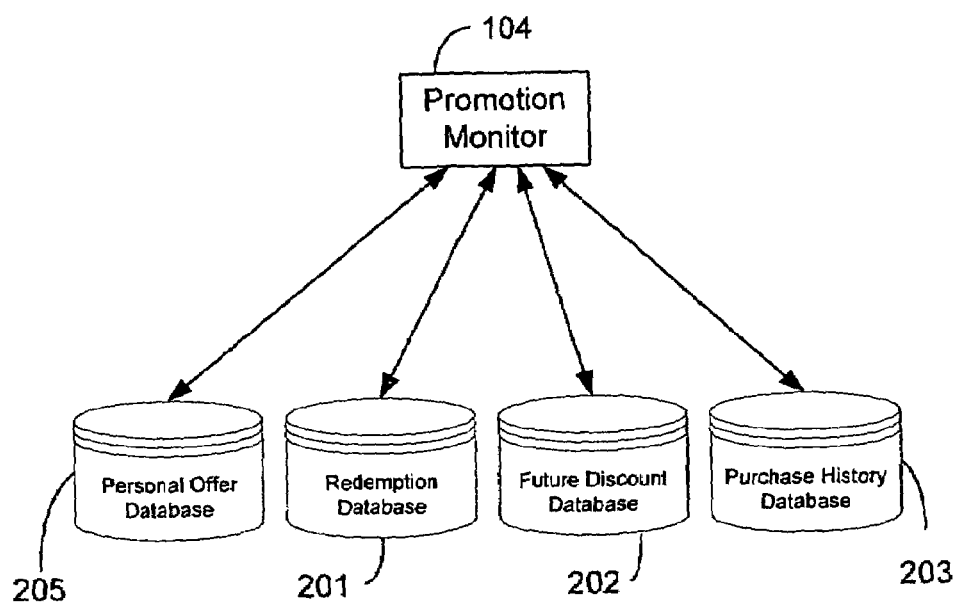
FIG. 2 illustrates the databases used to store data accumulated and used by the present invention.

FIG. 2 illustrates the databases maintained by the promotion generator 104 of the preferred embodiment and which contain data accumulated and used by the present invention. The content of these databases are defined below. The illustration in FIG. 2 shows one possible database architecture, and it is obvious that the teachings of this invention may be implemented with various database architectures which may be designed by practitioners in the relevant arts.

In the course of the preferred embodiment's processing of a customer purchase, the electronically readable list of purchase selections generated by the POS controller 102 is communicated to the promotion monitor 104 to support determining which, if any, purchase combination promotions have been satisfied by the customer's purchase selections. The promotion monitor 104 analyzes the list of purchase selections to determine if the customer has purchased combinations of items that trigger a benefit associated with a purchase combination promotion that have been made available to that customer.

The promotion monitor 104 of the preferred embodiment first determines if the customer has purchased items which qualify for an accumulated discount. Accumulated discounts may be available to all customers or available to selected customers as is described elsewhere in this description. An accumulated discount is triggered by the purchase of items which are associated with that accumulated discount. If the customer purchases a plurality of such single items, the discounts are accumulated onto a single coupon which the customer may redeem during a later shopping visit. The promotion monitor will compare the electronically readable list of purchase selections with the purchase requirements for accumulated discounts. The promotion generator 104 determines the type of benefit associated with the accumulated discount offer, e.g. a discount applied to the current purchase, a coupon for a discount during a subsequent visit or a further discount to be provided in response to the customer's presenting identification during a subsequent visit, and performs the processing required to implement that benefit.

If an accumulated discount coupon is to be provided to the customer, the promotion generator 104 will select a unique identification number, similar to a coupon serial number, to facilitate retrieval of the data defining the purchases that generated the coupon when the coupon is later redeemed. An example coupon is shown in FIG. 4. The unique identification number is encoded into barcode 403.

If an accumulated discount promotion is satisfied that has a benefit comprising a future discount, data defining the future discount are stored into the future discount database 202. Future discounts may either be presented as a coupon presented to the customer during the purchase satisfying the promotion's purchase requirements and which the customer presents to the POS system operator during a future shopping visit, or the future discount may be captured by storing the data defining the future discount and providing the discount in conjunction with the customer's presentation of personal identification during the future shopping visit. The future discount database 202 stores data for each future discount which may include some or all of the following: a) identification of the items purchased that triggered the offering of the future discount, b) the value of the benefit to be provided during the future purchase, c) a coupon serial number in the case of a coupon, d) an expiration date of the future discount offer, and e) an identification of the customer to support marketing analysis of customer selections across multiple shopping visits. The future discount database 202 may also store in association with each future discount the cost of the benefit which is to be charged to the sponsor of each item purchased in connection with the promotion, as is described elsewhere in this description. The promotion generator 104 may also define the data used to print a coupon similar to that illustrated in FIG. 4 and communicate the data to printer 103 to effect printing of the coupon. If a future discount is to be provided in response to the customer's presenting identification during a future purchase, a notice may be printed for the customer by printer 103, but that notice will not need to be presented during the subsequent visit.

The promotion monitor 104 will next determine if the customer has made any purchase combinations which qualify for a purchase combination promotion benefit. The promotion generator will compare the purchase selections to both general purchase combination promotions, i.e. purchase combination promotions are available to all customers of the retailer and do not require the presentation of a coupon, and to purchase combination promotions which were personally offered to that specific customer. Personally offered promotions include promotions for which the customer presents a coupon, which would be similar to that illustrated in FIG. 3 and the promotion is identified by bar code 303, or which were stored in association with the customer's identification and are to be retrieved when the customer presents his or her identification in the course of a purchase. The promotion generator will retrieve the specification of all purchase combination promotions available to that customer, and that are available to that customer upon presentation of an identification, and compare that customer's purchase selections to these promotions to determine which promotional benefits to provide to the customer. Benefit offers made to individual customers or associated with printed coupons distributed through any means are stored in the personal offer database 205. If the customer presented a coupon indicating a purchase combination promotion offer the promotion monitor 104 will retrieve the promotion requirements associated with the bar code on the coupon. If the customer presents a purchase combination coupon and the customer did not purchase the item combination required to receive the promotion's benefit, the promotion monitor 104 may notify the customer that he or she did not satisfy the promotion's requirements.

When the POS controller determines that the purchase combination requirements of a purchase combination promotion are satisfied, the POS controller stores the information concerning the purchases that satisfied the purchase requirement of the purchase combination promotion in conjunction with an identification of the purchase combination promotion. The promotion monitor 104 of the preferred embodiment stores the items which were purchased in association with each promotion and the amount of the benefit which is to be charged to the sponsor of each promotion. The data stored is described below and illustrated in FIG. 5. If the benefit provided by the promotion is a discount applied to the purchase satisfying the promotion's requirements, this data is stored directly into the redemption database 201. If the benefit is a coupon for a discount or further benefit to be applied during a future visit to the retailer, this data is stored into the future discount database 202.

Coupons issued by the preferred embodiment that are benefits associated with a purchase combination promotion are identified with a unique serial number barcode. The promotion monitor 104 stores into the future discount database 202 the unique coupon serial number in association with the purchased items which satisfied the purchase requirements of the purchase combination promotion conditions. When the coupon is redeemed, the POS operator will scan the coupon with scanner 101 to allow the scanner 101 and the POS controller 102 to determine the unique serial number printed on the coupon. The coupon's serial number is then provided to the promotion monitor 104 and is used to retrieve the data stored in the future discount database 202 associated with that coupon serial number. The data in the future discount database 202 is defined below and describes the purchased items that were actually purchased and that triggered the issuance of this coupon. The future discount database also contains information concerning the cost of the discount provided by the redeemed coupon that is apportioned to the sponsor of each item. The promotion monitor 104 then stores the sponsors bearing the costs of the redeemed benefit coupon, i.e. the sponsors of the items purchased which resulted in the production of this coupon, and the apportioned cost to be charged each sponsor, into the redemption database 201.

The data stored in the future discount database 202 is illustrated in FIG. 5. Each row in FIG. 5 represents a satisfied purchase combination promotion which has resulted in providing the customer with a discount on a future purchase. The "Promo ID" column contains a data field which indicates the promotion which was satisfied. The three entries show two entries for promotion "X" and one for promotion "Y." The data stored in the future discount database 202 describing a future discount associated with an accumulated discount or a purchase combination promotion is the same. The "Coupon#" field indicates the unique coupon number which is printed on a coupon given to the customer in response to satisfying the promotion. If a coupon is in fact printed, this number is encoded into a bar code which is printed on the coupon. If the future discount is provided based upon the customer's identification, the coupon number is still stored to identify the discount and facilitate subsequent data processing.

The "Cust. ID" column contains an identification number identifying the customer to the retailer. This customer identification number may be a frequent shopper club membership number, or other identification used by the particular retailer. The data illustrated in FIG. 5 has no customer identification stored for the second entry, that corresponding to coupon number 4334. This indicates that no identification was presented by that customer. Customers using the preferred embodiment who do not present identification will receive a printed coupon for the future discount. The "Total Value" column indicates the value of the discount to be applied during the future visit.

FIG. 5 further shows that a future discount expiration date, in the column labeled "Exp. Date," is stored in association with each future discount. The future discount will not be available after that date and the promotion monitor may remove the record from the database after the expiration date. The future discount database further stores an indication of each item purchased which satisfied the purchase combination promotion. This data is illustrated in FIG. 5 under the column marked "Items Purch." Associated with each item purchased is the cost of the promotion which is charged to the sponsor of each item purchased. The first entry shows the customer purchased items X, Y, and Z. The sponsor of each of these three items is to be charged $0.25 when and if the future discount is provided to the customer. The total of these charges is $0.75, which is divided between the $0.70 provided to the customer as a discount and a $0.05 administrative charge associated with the program. The promotion monitor 104 is programmed to apportion these costs among the sponsors for each item sold according to the cost distribution agreed to by the sponsors. The sponsors of a particular promotion may agree to assigned the costs equally, as shown in FIG. 5, or unequally, in which case the promotion generator is programmed to assign different costs to different sponsor of each item sold.

The contents of the redemption database 201 are shown in FIG. 6. The data in the redemption database is entered as discounts or other benefits are provided to customers. Promotions which provide a discount during the purchase that satisfied the promotion will enter data into the redemption database during that purchase transaction. Discounts which are provided through a future discount will have the data entered into the redemption database 201 when the future discount is applied, which will entail retrieving the data from the future discount database 202.

FIG. 6 shows the data contained in the redemption database 201 is a subset of the data stored in the future discount database 202. The columns in FIG. 6 have the same definitions as described for the future discount database 202 described in FIG. 5.

Alternative embodiments of the present invention may not store apportioned costs for each sponsor in the redemption database 201 and the future discount database 202, as is illustrated in the column labeled "Promo Cost." These embodiments will store the other data illustrated in FIGS. 5 and 6, but only the number of items sold in conjunction with a promotion will be stored, not which individual brands or items have been sold. These embodiments are limited to dividing the cost of the promotion equally among sponsors in proportion to the number of items that are sold in conjunction with the promotion, i.e. in proportion to the number of entries for each item associated with each promotion stored in the redemption database 201.

The data stored in the future discount database 202 and the redemption database 201 may be later analyzed to determine marketing related statistics and determine promotion effectiveness. These databases may be analyzed to determine statistics concerning the purchase selections customers made that satisfied the purchase combination promotion. These databases may also be analyzed to determine the success of a particular purchase combination promotion in enticing customers to purchase unrelated items that were part of the promotion by assembling statistics concerning the purchase combinations of unrelated items made in conjunction with a particular promotion. Statistics assembled from promotion related sales may then be compared to other statistics concerning the purchase of unrelated items in the same purchase by other customers who were not offered a promotion. The sales of items sold as part of the promotion can be measured distinctly from the sales of other items that are not part of the same promotion. The contents of the future discount database 203 may also be analyzed to determine statistics concerning which future discounts (coupons or discounts available to individual customers based upon the customer's identification) were not redeemed by customers and which promotions had high redemption rates.

The preferred embodiment will also store a list of all items purchased by a customer into the purchase history database 203. Embodiments which identify the customer will also include the customer's identification with the list of all items purchased. Identification of purchase combination promotions satisfied or future discounts provided as a benefit of purchase combination promotions and which were redeemed in the current purchase will also be stored in the purchase history database 203. The accumulation of all purchases and redeemed future discounts into the purchase history database will allow analysis of customer purchase behavior to support determining marketing statistics and evaluating the effectiveness of the promotion. Example marketing statistics include determining trends comprising other purchases made by customers who satisfied particular purchase combination promotions and identifying items not purchased by customers who satisfied a particular purchase combination promotions. Other marketing statistics which can be derived by analysis of a customer's purchases include identifying the number of customers who changed their behavior by a) changing the brands they purchased, b) purchasing a product from a category which he or she had not previously purchased, c) buying multiple types of products from the same brand, and d) increasing the amount of frequency of purchase.

We claim:

1. A computer implemented method comprising the steps of:
   determining if a set of items purchased by a customer satisfies a combination purchase requirement, wherein said combination purchase requirement requires purchase of a subset of and less than an enumerated set of items including a first item sponsored by a first sponsor and a second item sponsored by a second sponsor different from the first sponsor;
   upon determining that said set of items purchased satisfies said purchase requirement, providing to said customer a benefit associated with said combination purchase requirement;
   debiting said first sponsor of a first amount; and
   debiting said second sponsor of a second amount in response to a redemption of said benefit.

2. A method as set forth in claim 1 wherein said benefit is a discount applied to the current purchase.

3. A method as set forth in claim 1, wherein said first amount and said second amount are amounts previously agreed to by said first sponsor and said second sponsor.

4. A method as set forth in claim 1, wherein said benefit is not charging for an item contained within said set of purchased items.

5. A method as set forth in claim 1, wherein said benefit is a coupon and said redemption comprises presenting said coupon during a subsequent shopping visit.

6. A method as set forth in claim 1 further comprising the steps of:
   storing a description of said set of items purchased into a purchase history database; and
   analyzing the content of said purchase history database to determine marketing statistics.

7. A method as set forth in claim 6, wherein said step of storing further comprises storing an identification of said combination purchase requirement in association with said description of said set of items purchased.

8. A method as set forth in claim 6, wherein said step of storing further comprises storing an identification of said customer in association with said description of said set of items purchased.

9. A method as set forth in claim 8, further comprising the step of analyzing data contained in said purchased item database stored in association with said identification of said customer in order to determine purchasing patterns exhibited by said customer.

10. A method as set forth in claim 1, wherein said combination purchase requirement is available to all customers.

11. A method as set forth in claim 1, wherein said combination purchase requirement is available to selected customers.

12. A method as set forth in claim 11, wherein said selected customers are identified by presenting a printed coupon.

13. A method as set forth in claim 12, wherein said printed coupon comprises a bar code identification and said combination purchase requirement is associated with said bar code.

14. A method as set forth in claim 11, wherein said customer is determined to be one of said selected customers by personal identification.

15. A method as set forth in claim 14, wherein said selected customers are selected by membership in a frequent shopper club.

16. A method as set forth in claim 14, wherein said selected customers are selected by customer demographics.

17. A method as set forth in claim 14, wherein said selected customers are selected due to their use of an internet facility.

18. A method as set forth in claim 14, wherein said selected customers are selected based upon their observed purchase history.

19. A computer implemented method comprising the steps of:
   determining if one or more qualifying items are contained within a set of items purchased by a customer, wherein said one or more qualifying items qualify for an accumulated discount and further include a first item sponsored by a first sponsor and a second item sponsored by a second sponsor;
   upon determining that said set of items purchased by said customer contains said one or more qualifying items, each of said qualifying items qualifying for a separate discount, providing to said customer a future discount token for a singular benefit associated with said accumulated discount;
   redeeming said future discount token during a subsequent shopping visit;
   debiting said first sponsor of a first amount; and
   debiting said second sponsor a second amount in response to a redemption of said benefit.

20. A method as set forth in claim 19, wherein said first amount and said second amount are amounts previously agreed to by said first sponsor and said second sponsor.

21. A method as set forth in claim 19, further comprising the steps of:
   associating a unique identification with said future discount token;
   storing a description of said first item and said second item in association with said unique identification; and
   wherein said step of redeeming further comprises determining said unique identification and said step of debiting is performed in conjunction with retrieving said description of said first item and said second item.

22. A method as set forth in claim 19, wherein said future discount token is a printed coupon and said unique identification is a unique identification number encoded upon said printed coupon as a bar code.

23. A method as recited in claim 19, wherein said future discount token comprises a recording stored in association with a first identification of said customer and said step of redeeming comprises determining a second identification during said subsequent purchase and applying said specified discount if said second identification is the same as said first identification.

24. A method as set forth in claim 19 wherein a description of said first item and said second item is stored into a non-redemption database if said future discount token is not redeemed and said non-redemption database is analyzed to determine marketing statistics and promotion effectiveness.

25. A method as set forth in claim 19, wherein said step of redeeming further comprises the step of storing a description of said first item and said second item into a redemption database.

26. A method as set forth in claim 25 wherein said redemption database is analyzed to determine marketing statistics and promotion effectiveness.

27. A system comprising:
   means for determining if a set of items purchased by a customer satisfies a combination purchase requirement, wherein said combination purchase requirement requires purchase of a subset of and less than an enumerated set of items including a first item sponsored by a first sponsor and a second item sponsored by a second sponsor different from the first sponsor;
   means for providing to said customer, upon determining that said set of items purchased satisfies said purchase requirement, a benefit associated with said combination purchase requirement;
   means for debiting said first sponsor of a first amount; and
   means for debiting said second sponsor of a second amount in response to a redemption of said benefit.

28. A system as set forth in claim 27, wherein said benefit is a discount applied to the current purchase.

29. A system as set forth in claim 27, wherein said first amount and said second amount are amounts previously agreed to by said first sponsor and said second sponsor.

30. A system as set forth in claim 27, wherein said benefit is not charging for an item contained within said set of purchased items.

31. A system as set forth in claim 27, wherein said benefit is a coupon and said redemption comprises presenting said coupon during a subsequent shopping visit.

32. A system as set forth in claim 27, further comprising:
   means for storing a description of said set of items purchased into a purchase history database; and
   means for analyzing the content of said purchase history database to determine marketing statistics.

33. A system as set forth in claim 32, wherein said means for storing further comprises means for storing an identification of said combination purchase requirement in association with said description of said set of items purchased.

34. A system as set forth in claim 32, wherein said means for storing further comprises means for storing an identification of said customer in association with said description of said set of items purchased.

35. A system as set forth in claim 34, further comprising means for analyzing data contained in said purchased item database stored in association with said identification of said customer in order to determine purchasing patterns exhibited by said customer.

36. A system as set forth in claim 27, wherein said combination purchase requirement is available to all customers.

37. A system as set forth in claim 27, wherein said combination purchase requirement is available to selected customers.

38. A system as set forth in claim 37, wherein said selected customers are identified by presenting a printed coupon.

39. A system as set forth in claim 38, wherein said printed coupon comprises a bar code identification and said combination purchase requirement is associated with said bar code.

40. A system as set forth in claim 37, wherein said customer is determined to be one of said selected customers by personal identification.

41. A system as set forth in claim 40, wherein said selected customers are selected by membership in a frequent shopper club.

42. A system as set forth in claim 40, wherein said selected customers are selected by customer demographics.

43. A system as set forth in claim 40, wherein said selected customers are selected due to their use of an internet facility.

44. A system as set forth in claim 40, wherein said selected customers are selected based upon their observed purchase history.

45. A system comprising:
   means for determining if one or more qualifying items are contained within a set of items purchased by a customer, wherein said one or more qualifying items qualify for an accumulated discount and further include a first item sponsored by a first sponsor and a second item sponsored by a second sponsor;
   means for providing to said customer, upon determining that said set of items purchased by said customer contains said one or more qualifying items, each of said qualifying items qualifying for a separate discount, a future discount token for a singular benefit associated with said accumulated discount;
   means for redeeming said future discount token during a subsequent shopping visit;
   means for debiting said first sponsor of a first amount; and
   means for debiting said second sponsor a second amount in response to a redemption of said benefit.

46. A system as set forth in claim 45, wherein said first amount and said second amount are amounts previously agreed to by said first sponsor and said second sponsor.

47. A system as set forth in claim 45, further comprising:
   means for associating a unique identification with said future discount token;
   means for storing a description of said first item and said second item in association with said unique identification;
   and wherein said means for redeeming further comprises means for determining said unique identification and said means for debiting operates in conjunction with means for retrieving said description of said first item and said second item.

48. A system as set forth in claim 45, wherein said future discount token is a printed coupon and said unique identification is a unique identification number encoded upon said printed coupon as a bar code.

49. A system as set forth in claim 45, wherein said future discount token comprises a recording stored in association with a first identification of said customer and said means for redeeming comprises means for determining a second identification during said subsequent purchase and means for applying said specified discount if said second identification is the same as said first identification.

50. A system as set forth in claim 45 wherein a description of said first item and said second item is stored into a non-redemption database if said future discount token is not redeemed and said non-redemption database is analyzed to determine marketing statistics and promotion effectiveness.

51. A system as set forth in claim 45, wherein said means for redeeming further comprises means for storing a description of said first item and said second item into a redemption database.

52. A system as set forth in claim 32 wherein said redemption database is analyzed to determine marketing statistics and promotion effectiveness.

* * * * *